A. F. BATCHELDER.
ELECTRIC AIR COMPRESSOR.
APPLICATION FILED SEPT. 3, 1901.
947,882.
Patented Feb. 1, 1910.
4 SHEETS—SHEET 1.
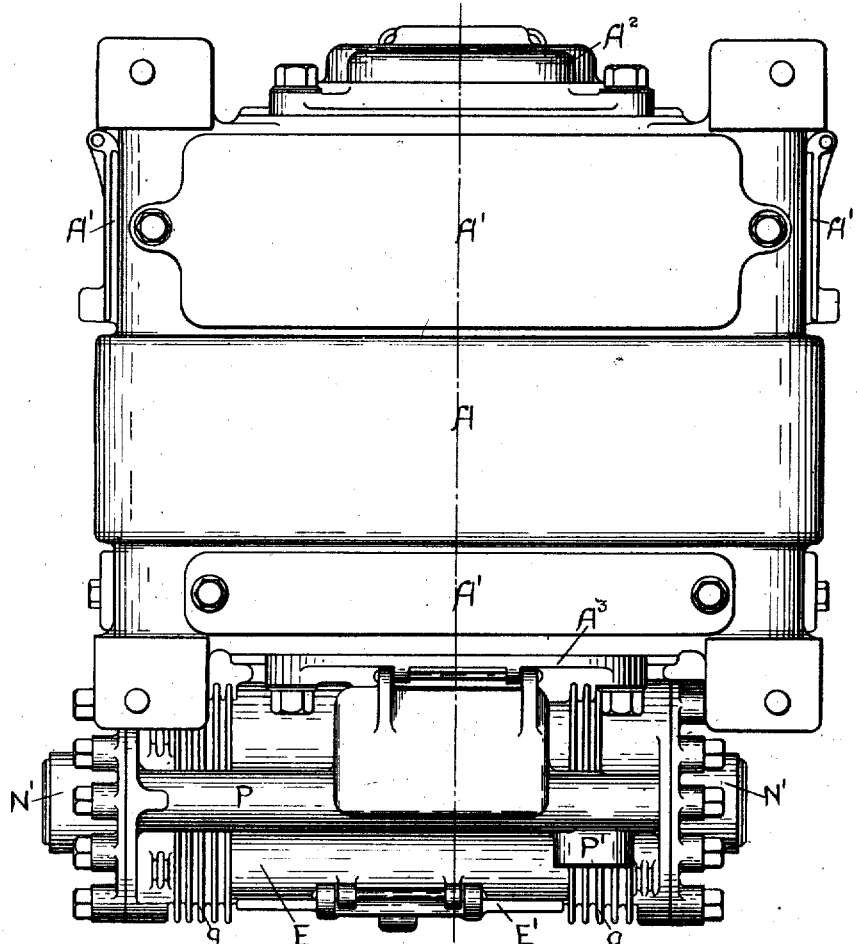
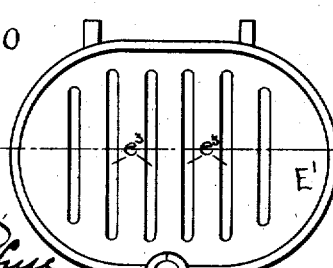
Witnesses:
Inventor.
Asa F. Batchelder
by
Atty

A. F. BATCHELDER.
ELECTRIC AIR COMPRESSOR.
APPLICATION FILED SEPT. 3, 1901.

947,882.

Patented Feb. 1, 1910.
4 SHEETS—SHEET 3.

Witnesses:
Robt C. Chapman
Benjamin B. Hull

Inventor.
Asa F. Batchelder.
by Albert G. Davis
Atty.

A. F. BATCHELDER.
ELECTRIC AIR COMPRESSOR.
APPLICATION FILED SEPT. 3, 1901.

947,882.

Patented Feb. 1, 1910.
4 SHEETS—SHEET 4.

Witnesses.

Inventor.
Asa F. Batchelder.
by
Atty

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

ELECTRIC AIR-COMPRESSOR.

947,882.  Specification of Letters Patent.  Patented Feb. 1, 1910.

Application filed September 3, 1901. Serial No. 74,244.

*To all whom it may concern:*

Be it known that I, ASA F. BATCHELDER, a citizen of the United States, residing at Schenectady, county of Schenectady, State of New York, have invented certain new and useful Improvements in Electric Air-Compressors, of which the following is a specification.

This invention relates to machines for compressing air, and especially those used in connection with air-brake systems on railway cars.

The object of the invention is to provide an improved pump of this kind, driven by an electric motor, for use in the air-brake equipment of electrically operated railway cars and trains.

Electric air pumps have been used heretofore, but they are usually composed of a small high speed motor geared down to a pump, forming a rather bulky and awkward machine, and one that is noisy in operation.

My invention consists in certain details of construction and arrangement whereby a compact, light, powerful and noiseless pump will be produced. It embodies a railway motor, directly connected to a double cylinder single-acting air-pump, arranged to run at a comparatively slow speed, and provided with means for oiling the moving parts and cooling the pump cylinders.

Figure 2:
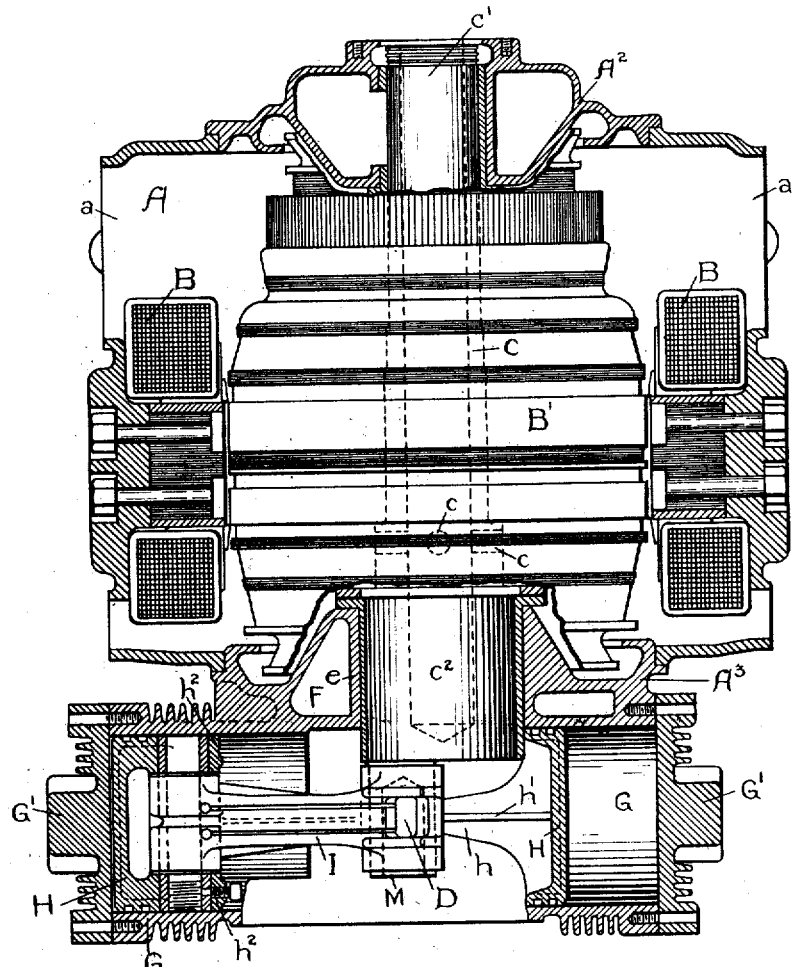
Figure 8:
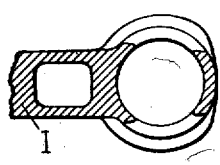
Figure 3:
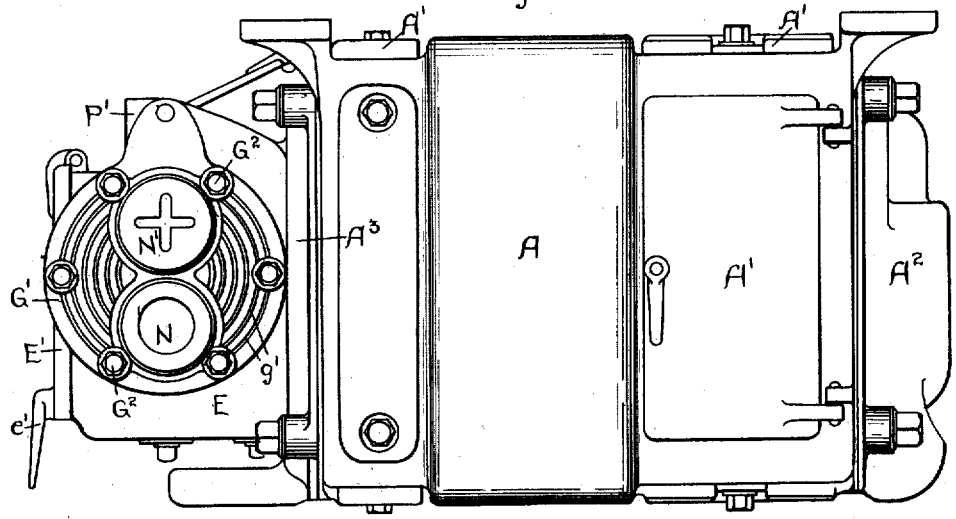
Figure 4:
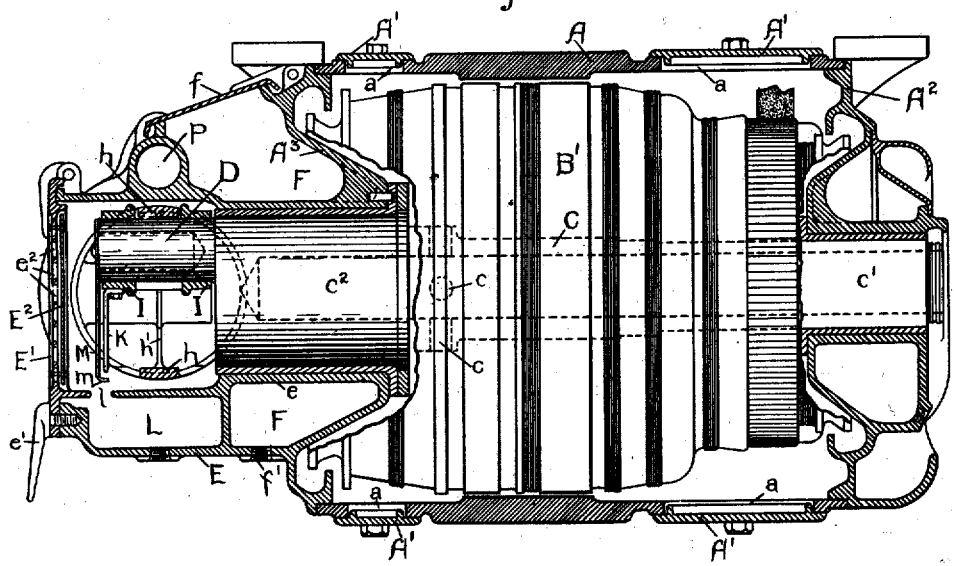
Figure 5:
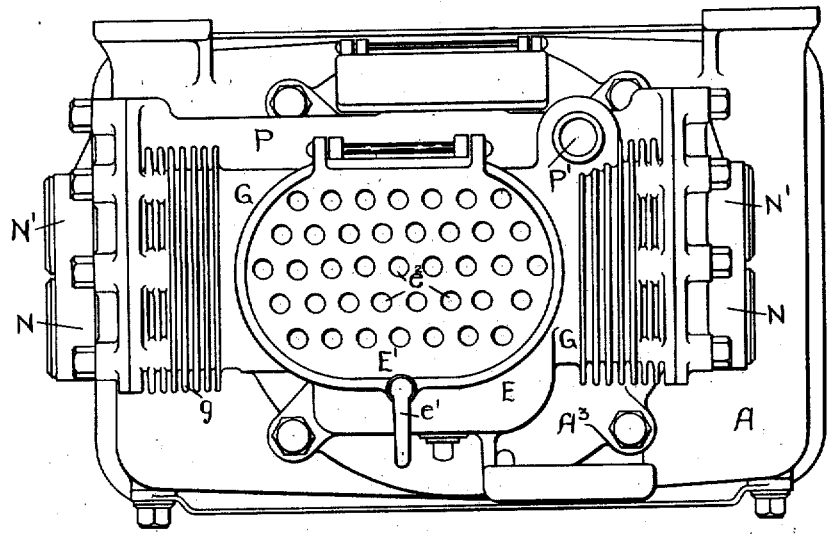
Figure 6:
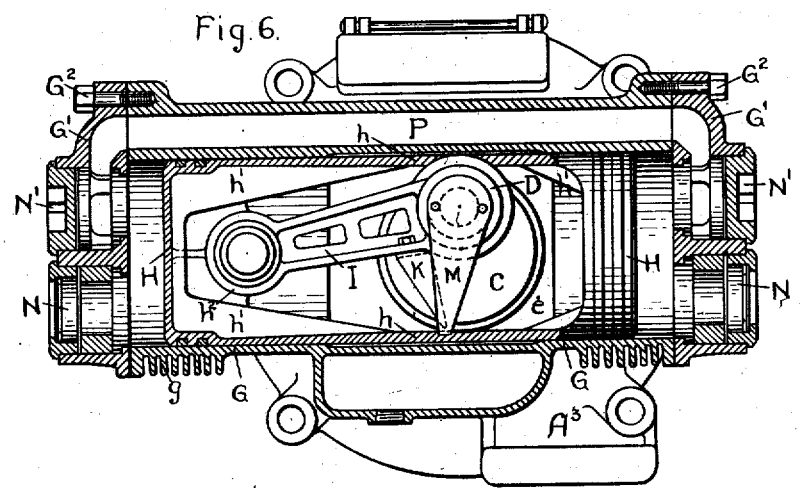
Figure 9:
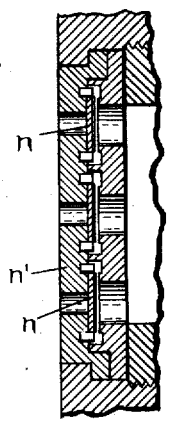
Figure 7:
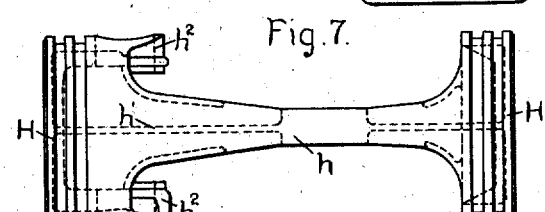

In the accompanying drawing, Figure 1 is a top plan view of my improved electric air-pump. Fig. 2 is a longitudinal horizontal section thereof. Fig. 3 is a side elevation. Fig. 4 is a sectional elevation lengthwise of the motor. Fig. 5 is an end elevation. Fig. 6 is a sectional elevation lengthwise of the pump cylinder. Fig. 7 is a top plan view of the pump piston. Fig. 8 is a section of the crank end of the pitman. Fig. 9 is an enlarged section of one of the valves. Fig. 10 shows a modified door. Fig. 11 is a cross section of the same on the line 11—11, Fig. 10.

The motor is of the inclosed type, having a casing A inside of which are contained the field coils B and the armature B', whose diameter is as large as possible in order to give great torque and low speed. The armature shaft C is tubular, with radial holes $c$ to enable air to pass in through the shaft and out of said holes between the sections of the laminated armature core and the coils wound thereon and escape under the edges of the covers and doors A' which close the openings $a$ in the top, bottom and walls of the casing. This mode of keeping the motor cool is shown in a patent to E. D. Priest, 727,686, May 12, 1903.

The journal-bearings of the armature-shaft are in heads $A^2$ $A^3$ slightly larger than the armature, so that when either of said heads is removed, the armature can be drawn out of the motor. The brush-holders (not shown) are mounted on the inside of the frame A. The construction of these brush-holders is shown and claimed in a patent to A. F. Batchelder, 727,771, May 12, 1903. The ends of the armature are countersunk to enable the journal bearings to be located partially inside of them, in order to obtain long bearings without unduly lengthening the motor.

The journal $c'$ at the commutator end of the shaft may be of the usual size, but the one $c^2$ at the other end is made quite large in diameter in order to permit a crank pin D to project from its end and wholly within its peripheral limits. By this construction, the pin does not interfere with the lengthwise removal of the shaft when the head A is taken off. The crank-pin is preferably hollow, as indicated by dotted lines in Figs. 2 and 4.

The head $A^3$ is preferably cast integral with a rectangular box E projecting beyond the bearing $e$ of the journal $c^2$ and forming a housing for the crank-pin D to work in. The front of this box is closed by a hinged lid E', provided with a clamping-screw $e'$. A chamber F surrounds the bearing $e$, with an opening at the top provided with a lid $f$, and a drain-outlet in the bottom closed by a screw-plug $f'$. The chamber may be filled with oil to keep the bearing $e$ lubricated.

Projecting from each end of the box E is a pump-cylinder G, preferably integral with said box, and provided with external circumferential ribs $g$ to radiate the heat of the air compressed in the cylinders. The two cylinders are in line with each other, their axis being at right angles to the axis of the armature shaft, and intersecting it at a point beyond the end of the journal $c^2$ about half the length of the crank-pin D.

In each cylinder is a piston H, the two being connected by upper and lower tie-bars $h$, preferably cast integral with the pistons, and located in the plane of their peripheries. The tie-bars are preferably strengthened by internal ribs $h'$, radial to the pistons. One piston has behind it two bearings $h^2$, whose common axis is transverse to that of the cylinders, and also parallel with the axis of the armature shaft. A pitman or connecting rod I is pivoted at one end between these bearings, its other end being pivotally connected with the crank pin D. In order to save space, and obtain as great a crank-throw as possible, the crank end of the rod may be cut away at top and bottom to straddle the tie-bar $h$ when the crank-pin is on the quarter, as shown in Figs. 2, 4, 6, and 8, the surface of the pin coming close to the inside of the tie-bar, as shown. The working part of one of the pump-cylinders is farther from the shaft C than that of the other to permit the use of as long a connecting rod as possible.

Secured to the connecting-rod is a sheet-metal finger K which at every revolution dips through a hole $l$ into an oil-cellar L under the box E, preferably integral therewith.

On the crank-pin is fastened a sheet-metal arm M having a hook $m$ at one end adapted to pass under the end of the finger K when the latter is at the highest point in its path, and receive from said finger the drop of oil it has brought up. The rotating arm M throws the oil by centrifugal force into all parts of the space between the two pistons, thus keeping everything well lubricated. This oiling device forms the subject of a patent to George Macloskie, No. 730,676, June 9, 1903. The door E' has perforations $e^2$ or slots $e^3$ for ventilation, and a baffle plate on the inside to keep the oil from being thrown out of said perforations: said plate being either solid as at $E^2$, or slotted as at $E^3$, the slots alternating with those in the door as shown in Fig. 11.

The heads G' of the pump-cylinders are secured by screwbolts $G^2$, and are preferably provided with concentric ribs $g'$ to radiate heat. Each head carries one or more inlet valves N and one or more outlet valves N', made substantially as shown in a patent to A. F. Batchelder, #883,928, April 7, 1908. Each valve is preferably made up of a gang of small disk valves $n$, all mounted in a casing $n'$, and permitting the air to pass around their edges. By using a large number of small valves, their lift can be made small, and the noise and whistling reduced to a minimum. To avoid confusion, the small valves are not shown in Fig. 6, but are separately illustrated in Fig. 9. The air drawn in through the inlet valves N and compressed in the cylinders flows through the outlet valves N' into a passage P and thence to a delivery-pipe P'.

It will be seen that my air-compressor is compact and yet powerful, that it is strong and simple in construction, can be readily inspected, and can be easily taken apart for repairs, if necessary.

The central dotted line in Fig. 1 indicates that if desired, the entire motor casing, heads, and pump cylinders can be made in two parts united along the vertical plane of the axis of the motor shaft.

It will be observed that the head $A^3$ is attached to the motor casing by four bolts spaced at equal angular distances around the motor shaft. This permits the motor casing to be turned completely over if desired, so that it can be placed upon a floor or similar support instead of being hung under the car by bolting it up to the under side of the floor timbers.

It has been stated that the head $A^3$ is preferably cast integral with a box E, but it is evident that the box may be omitted, and the cylinders G supported solely by their integral connection with the head $A^3$. It is also evident that the number of pump cylinders is not necessarily restricted to two.

What I claim as new and desire to secure by Letters Patent of the United States, is—

1. The combination with a reciprocating air compressor, of a motor having its frame rigidly connected to said compressor and provided with an axially removable drive-shaft one end of which is provided with an enlarged journal, a crank-pin located at the end thereof and entirely within the peripheral limits of said journal, an operative connection between said crank-pin and the reciprocating member of the air compressor, and a bearing for said enlarged journal whereby the motor and compressor may be separated axially of the drive shaft.

2. The combination with an air compressor, of a driving motor, an axially removable drive shaft for said motor, an enlarged journal at one end of said shaft, a crank-pin on said end within the peripheral limits of the journal, a connection between said crank-pin and the movable member of the compressor, and a bearing for said journal permitting axial removal of said driving shaft in a direction away from the crank-pin end.

3. The combination with a driving motor comprising a frame, a driving shaft having an enlarged journal at one end, and a crank-pin on said end within the peripheral limits of said enlarged journal, of an air compressor comprising an operating connection between said crank-pin and the movable member of the compressor, a frame detachably secured to the frame of said driving motor, and a bearing for said enlarged journal formed in and extending through one side of the frame of the compressor, and permitting axial movement of the shaft through the bearing in a direction away from the crank-pin end, whereby th— the driving motor may be separated axially of the driving shaft.

4. In combination, an air compressor having a frame supporting opposed cylinders, pistons in said cylinders, a driving motor having its frame detachably secured to said compressor frame, an enlarged journal at one end of the motor shaft, a crank-pin on said end within the peripheral limits of said enlarged journal, a cylindrical bearing for said journal extending through one side of the compressor frame between said cylinders, and a connection between said crank-pin and said pistons.

5. The combination with a rotary motor comprising a frame, a drive shaft having an enlarged journal at one end and a crank on said end within the peripheral limits of the journal, of a compressor comprising a reciprocating piston, connections between said crank and said piston, a frame secured to the frame of the motor, and a cylindrical bearing for said journal extending through one side of the frame of the compressor.

6. The combination with a motor casing, of an inclosing head therefor containing a journal bearing for the main drive-shaft, and said head having two integral alined pump cylinders and a box forming a housing for the operative connection between the motor and pump.

7. The combination with a motor comprising a casing and a drive-shaft having an enlarged journal at one end, of a detachable inclosing head for said casing, two alined pump cylinders integrally connected to said head, a bearing for the enlarged journal movable axially of the shaft away from the motor and carried by said head, a crank on the journal within the peripheral limits of the bearing, and a connection between said crank and the pistons of said cylinders.

8. The combination with a motor comprising a casing and a drive-shaft having an enlarged journal at one end, of a detachable inclosing head for said casing, two alined pump cylinders integrally connected to said head, a bearing for the enlarged journal movable axially of the shaft away from the motor and carried by said head, a crank on the journal within the peripheral limits of the bearing, a connection between said crank and the pistons of said cylinders, a housing for the crank, and an oil cellar below said housing.

9. The combination with two alined cylinders, of two pistons therein, two tie-bars connecting said pistons, a crank-pin revolving between and in the plane of said tie-bars, and a connecting rod having a forked crank end for straddling said tie-bars and engaging said crank-pin on opposite sides of the plane of said tie-bars.

10. The combination with two pump-cylinders in line with each other, of two pistons, upper and lower tie-bars integrally uniting said pistons, an actuating crank-pin revolving between and in the plane of said tie-bars, and a connecting-rod pivoted to one of said pistons and engaging with said crank-pin on opposite sides of the plane of said tie-bars.

11. The combination with two pump cylinders in line with each other, of a double piston comprising two piston heads, two integral tie-bars uniting said pistons in the plane of their peripheries, radial ribs inside said bars and bearings on one piston in the plane of said tie-bars and whose axis is at right angles to that of the pistons, an actuating crank pin revolving between and in the plane of said tie bars, and a connecting rod pivoted to one of said pistons and engaging said crank pin on opposite sides of the plane of said tie bars.

In witness whereof, I have hereunto set my hand this 30th day of August, 1901.

ASA F. BATCHELDER.

Witnesses:
EDWARD WILLIAMS, Jr.,
M. H. EMERSON.